(12) United States Patent
Mizushima et al.

(10) Patent No.: US 7,446,916 B2
(45) Date of Patent: Nov. 4, 2008

(54) HOLOGRAPHIC RECORDING AND REPRODUCTION APPARATUS, AND METHOD WITH TEMPERATURE ADJUSTMENT DEVICE FOR SEMICONDUCTOR LASER

(75) Inventors: Tetsuro Mizushima, Moriguchi (JP); Takuya Tsukagoshi, Sagamihara (JP); Hideaki Miura, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 290 days.

(21) Appl. No.: 10/573,802

(22) PCT Filed: Sep. 29, 2004

(86) PCT No.: PCT/JP2004/014237

§ 371 (c)(1),
(2), (4) Date: Mar. 28, 2006

(87) PCT Pub. No.: WO2005/036538

PCT Pub. Date: Apr. 21, 2005

(65) Prior Publication Data

US 2006/0280210 A1    Dec. 14, 2006

(30) Foreign Application Priority Data

Oct. 8, 2003    (JP)    ............................. 2003-348969

(51) Int. Cl.
  *G03H 1/26*    (2006.01)
  *H01S 3/04*    (2006.01)
(52) U.S. Cl. .......................................... 359/22; 372/34

(58) Field of Classification Search ............... 359/1, 359/22, 24, 25, 27, 32, 35; 372/34, 38.02; 369/44.23, 44.37, 44.39, 47.1–47.55
See application file for complete search history.

(56) References Cited

U.S. PATENT DOCUMENTS

| 4,853,915 A | * | 8/1989 | Takasago et al. ............ 369/30.1 |
| 6,825,960 B2 | * | 11/2004 | Curtis et al. ................... 359/35 |
| 2002/0075776 A1 | | 6/2002 | Kasazumi et al. | |

FOREIGN PATENT DOCUMENTS

| JP | A 61-89527 | 5/1986 |
| JP | A 4-93881 | 3/1992 |
| JP | A 8-202246 | 8/1996 |
| JP | A 2002-216359 | 8/2002 |

* cited by examiner

*Primary Examiner*—Alessandro Amari
(74) *Attorney, Agent, or Firm*—Oliff & Berridge, PLC

(57) ABSTRACT

A holographic memory reproduction apparatus which makes a wavelength of a reproducing laser beam coincident with a wavelength of a laser beam used for holographic recording when information is reproduced from a holographic recording medium. In the holographic memory reproduction apparatus 10, a temperature adjustment device 26 is attached to a semiconductor laser 12. On the holographic recording medium 16, wavelength information of the laser beam used for recording is recorded as a wavelength address hologram 28. When the information is reproduced, the temperature adjustment device 26 is controlled by a wavelength control device 24 in accordance with a signal beam from the wavelength address hologram 28, thereby making an oscillation peak wavelength of the semiconductor laser 12 coincident with the wavelength of the laser beam used for recording.

10 Claims, 2 Drawing Sheets

HOLOGRAPHIC RECORDING AND REPRODUCTION APPARATUS, AND METHOD WITH TEMPERATURE ADJUSTMENT DEVICE FOR SEMICONDUCTOR LASER

TECHNICAL FIELD

The present invention relates to a holographic recording and reproduction apparatus for holographically recording information on a recording medium and for reproducing the information, a holographic memory reproduction apparatus for reproducing information from a recorded hologram, a holographic recording and reproducing method, and a holographic recording medium.

BACKGROUND ART

A holographic recording and reproducing method is proposed as a recording technology that achieves a large recording capacity and enables high-speed transfer of information.

In the holographic recording and reproduction, a gas laser and a solid-state laser are usually used as a light source in order to keep wavelength stability and coherency. Those light sources have problems that they make the size of a device larger and increases a manufacturing cost of the device.

On the contrary, if a semiconductor laser is used as the light source, the size and the manufacturing cost of the device can be reduced. However, the semiconductor laser has a problem that it is inferior to the gas laser and the solid-state laser in the wavelength stability and the coherency.

In general, a recording layer of a holographic recording medium, in which a hologram is formed, has a thickness of several tens of microns or more, and preferably 100 μm or more, in order to increase recording density.

Such a thick hologram has angular selectivity and wavelength selectivity for a reproducing laser beam. That is, information can be reproduced only when a reference beam is incident on the hologram at an angle and a wavelength of a recording condition.

In general, multiplexed information is recorded in the same volume by changing an angle condition of the reference beam or the like in an appropriate manner.

When information is reproduced with a laser beam having a different wavelength from the wavelength of the reference beam corresponding to the recorded hologram, an intensity of reproduced beam (an intensity of diffracted beam) becomes weaker as compared with the case where reproduction is performed with a laser beam having a wavelength coincident with the wavelength of the reference beam. This is because there is a certain wavelength selectivity of the hologram. Moreover, angular distortion occurs in the reproduced beam. In this case, if two-dimensional data is recorded in the hologram, the two-dimensional data is reproduced with distortion.

The lowering of the intensity of the reproduced beam and the distortion in the reproduced beam described above can be corrected by design of a device for capturing two-dimensional data, such as a CCD or a CMOS, or a modulation pattern. However, correction is difficult when the wavelength difference is large.

The wavelength selectivity is enhanced in proportion to the thickness of the recording layer of a holographic recording medium. Thus, when the recording layer is made thicker in order to increase the recording density, even a slight wavelength difference between the reproducing beam and the reference beam makes reproduction of information difficult.

In order to overcome the above, Japanese Patent Laid-Open Publication No. 2002-216359 describes that a wavelength-variable semiconductor laser including an optical waveguide type wavelength conversion device is used as a light source to thereby vary a wavelength of a reproducing laser beam in accordance with thermal expansion and contraction of a recording medium. This is based on that a most appropriate wavelength of the reproducing beam is varied by thermal expansion and contraction of the recording medium during reproduction of information recorded by holographic recording.

Moreover, a holographic recording apparatus using a temperature adjustment element and a Fabry-Perot etalon in order to keep wavelength stability of a semiconductor laser during recording is proposed in Japanese Patent Laid-Open Publication No. Hei 8-202246. In this holographic recording apparatus, a temperature and an injection current of the semiconductor laser are made stable so as to make a wavelength of a laser beam during recording stable.

The aforementioned holographic optical information recoding and reproduction apparatus described in Japanese Patent Laid-Open Publication No. 2002-216359 has the following problem. In this apparatus, the wavelength-variable semiconductor laser as a wavelength-variable coherent light source and the optical waveguide type wavelength conversion device are controlled based on a state of a reproduced signal beam so as to make the wavelength of the reproducing beam most appropriate. Thus, it takes a long time to actually obtain a laser beam having the most appropriate wavelength after the reproduction apparatus starts up.

Moreover, there is another problem that it is difficult to obtain a short wavelength required for increasing the density in case of using the wavelength-variable semiconductor laser. In addition, the semiconductor laser generally has a variation of an oscillation peak wavelength between products having the same design and the oscillation wavelength varies with a temperature.

Furthermore, in the holographic recording apparatus described in Japanese Patent Laid-Open Publication No. 8-202246, the wavelength of a laser beam of a reproducing semiconductor laser during reproduction is not taken into consideration. Thus, reproduction may become difficult when an oscillation peak wavelength of the semiconductor laser in a reproduction apparatus is shifted from the wavelength of the laser beam used for recording because of an excessively high or low environmental temperature.

DISCLOSURE OF THE INVENTION

This invention has been achieved in view of the foregoing conventional problems. It is thus an object of the invention to provide a holographic recording and reproduction apparatus, a holographic recording and reproducing method, and a holographic memory reproduction apparatus that can start up quickly when reproduction is performed and can use a laser beam having a most appropriate wavelength as a reproducing beam so as to correspond to an individual recording medium, and a holographic recording medium used for these.

The present inventor has made intensive studies and found that reproducing laser beam having a most appropriate wavelength can be utilized by holographically recording wavelength information of a laser beam used for recording as a wavelength address hologram in advance and controlling a temperature of a semiconductor laser based on the recorded wavelength information when reproduction of information is performed.

In summary, the above-described objectives are achieved by the following aspects of the present invention.

(1) A holographic memory reproduction apparatus for irradiating a holographic recording medium on which wavelength information of a recording laser beam is recorded as a wavelength address hologram with a reproducing laser beam from a semiconductor laser to reproduce information that is recorded by holographic recording, comprising: a temperature adjustment device for controlling a temperature of the semiconductor laser; and a wavelength control device for controlling a wavelength of the reproducing laser beam to be approximately coincident with a wavelength of the recording laser beam by adjusting a temperature of the semiconductor laser via the temperature adjustment device based on the wavelength information reproduced from the wavelength address hologram by the reproducing laser beam, prior to reproduction of the information recorded on the holographic recording medium with the reproducing laser beam.

(2) The holographic memory reproduction apparatus according to (1), wherein the wavelength control device performs feedback control for the temperature adjustment device to make an intensity of a signal beam diffracted from the wavelength address hologram a constant value or place a detection position of the signal beam at a predetermined position during irradiation with the reproducing laser beam.

(3) The holographic memory reproduction apparatus according to (1) or (2), wherein the wavelength control device has information on an oscillation peak wavelength corresponding to the temperature of the semiconductor laser and is configured to control the temperature of the semiconductor laser to make the oscillation peak wavelength coincident with the wavelength of the recording laser beam.

(4) A holographic recording and reproduction apparatus for holographically recording information on a holographic recording medium using a recording laser beam and for reproducing the information recorded on the holographic recording medium using a reproducing laser beam, comprising: a semiconductor laser for generating the recording laser beam and the reproducing laser beam; a temperature adjustment device capable of adjusting a temperature of the semiconductor laser; a wavelength information recording device for recording wavelength information of the recording laser beam as a wavelength address hologram on the holographic recording medium when the information is recorded on the holographic recording medium with the recording laser beam; and a wavelength control device for controlling a wavelength of the reproducing laser beam to be approximately coincident with a wavelength of the recording laser beam by adjusting the temperature of the semiconductor laser via the temperature adjustment device based on a signal beam diffracted from the wavelength address hologram by the reproducing laser beam, when the information recorded on the holographic recording medium is reproduced with the reproducing laser beam.

(5) The holographic recording and reproduction apparatus according to (4), wherein the wavelength control device includes a circuit for performing feedback control for the temperature adjustment device to make an intensity of the signal beam diffracted from the wavelength address hologram a constant value or place a detection position of the signal beam at a predetermined position during irradiation with the reproducing beam.

(6) The holographic recording and reproduction apparatus according to (4) or (5), wherein the wavelength control device has information on an oscillation peak wavelength corresponding to the temperature of the semiconductor laser and is configured to control the temperature of the semiconductor laser to make the oscillation peak wavelength coincident with the wavelength of the recording laser beam.

(7) A holographic recording and reproducing method for holographically recording information on a holographic recording medium using a recording laser beam and for reproducing the information recorded on the holographic recording medium using a reproducing laser beam, comprising: a process of recording wavelength information of the recording laser beam as a wavelength address hologram on the holographic recording medium when the information is recorded on the holographic recording medium with the recording laser beam; a process of irradiating the wavelength address hologram with the reproducing laser beam to reproduce the wavelength information from a diffracted signal beam, prior to reproduction of the information recorded on the holographic recording medium; and a process of adjusting a temperature of a semiconductor laser emitting the reproducing laser beam to make a wavelength of the reproducing laser beam approximately coincident with a wavelength in accordance with the wavelength information based on the reproduced wavelength information.

(8) The holographic recording and reproducing method according to (7), wherein control is performed to make an intensity of the signal beam diffracted from the wavelength address hologram a constant value or place a detection position of the signal beam at a predetermined position during irradiation with the reproducing laser beam.

(9) A holographic recording medium on which information is recorded as a hologram in a data area and wavelength information of a recording laser beam used for recording of the information is recorded as a wavelength address hologram.

(10) The holographic recording medium according to (9), wherein the wavelength address hologram is recorded in a lead-in area that is to be accessed prior to an access to the data area when the information is reproduced.

It should be noted that the semiconductor laser is a device in which temperature increase causes lowering of an energy gap, a change in refractive index, and expansion of a length of a resonator to occur, thereby shifting an oscillation wavelength to a longer wavelength. The shift amount may depend on a material and a structure of the semiconductor laser and is 0.05 to 0.3 nm/° C. For example, a wavelength of a GaAlAs semiconductor laser can be controlled in a range of approximately 7 nm by temperature adjustment of 30° C.

BEST MODE FOR CARRYING OUT THE INVENTION

Wavelength information of a laser beam used for holographic recording is recorded as a wavelength address hologram on a holographic recording medium in advance. A temperature adjustment device for controlling a temperature of a reproducing semiconductor laser is provided in the reproducing semiconductor laser. When information on the holographic recording medium is reproduced, the wavelength address hologram portion is irradiated while an oscillation peak wavelength of the semiconductor laser is varied by increasing or decreasing the temperature of the semiconductor laser via the temperature adjustment device by a wavelength control device, and feedback control is performed for the temperature of the semiconductor laser until a signal beam (diffracted beam) from the wavelength address hologram has a predetermined intensity or reaches a predetermined detection position. In this manner, a most appropriate wavelength of a reproducing beam is obtained, thereby achieving the above object.

First Embodiment

Hereinafter, a first embodiment of the present invention will be described in detail with reference to the drawings.

Figure 1:
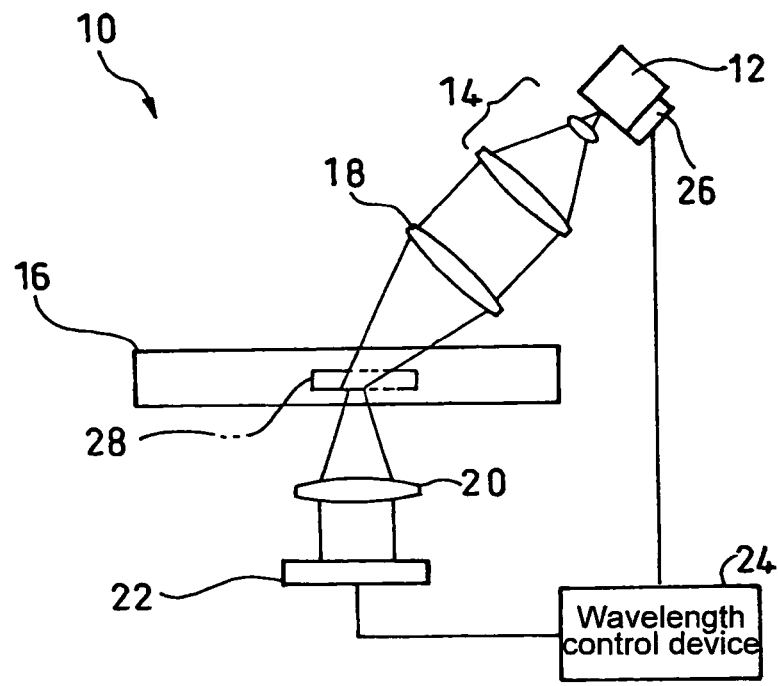
FIG. 1 is an optical system diagram showing a holographic memory reproduction apparatus according to a first embodiment of the invention.

As shown in FIG. 1, a holographic memory reproduction apparatus 10 of this first embodiment comprises: a semiconductor laser 12 for oscillating a reproducing laser beam; a beam expander 14 for enlarging a beam diameter of the reproducing laser beam emitted from this semiconductor laser 12; a lens 18 for directing the reproducing laser beam having the beam diameter enlarged by this beam expander 14 to a holographic recording medium 16; a spatial imaging element 22 for receiving a signal beam via a lens 20, the signal beam being obtained by diffraction of the reproducing laser beam incident on the holographic recording medium 16 via the lens 18; a wavelength control device 24 to which a signal detected by this spatial imaging element 22 is input; and a temperature adjustment device 26, attached to the semiconductor laser 12, for adjusting a temperature of the semiconductor laser 12 based on a control signal from the wavelength control device 24. The temperature adjustment device 26 is composed of a Peltier device alone, a combination of a thermocouple and a heater, a combination of a Peltier device and another element, or the like, and is arranged to control the temperature of the semiconductor laser 12 within a constant range.

A wavelength address hologram 28 is recorded on the holographic recording medium 16 at a portion that is accessed by the holographic memory reproduction apparatus 10 during reproduction first.

Figure 2:
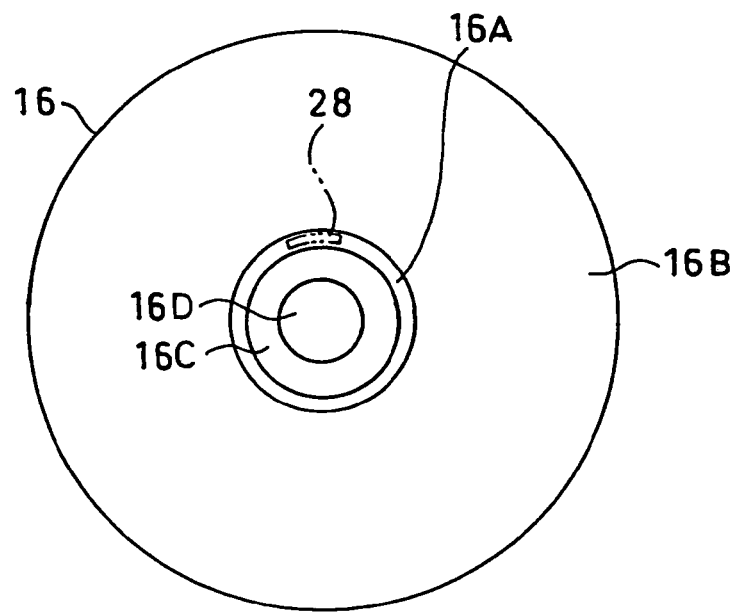
FIG. 2 is a plan view schematically showing a holographic recording medium on which information to be reproduced by the holographic memory reproduction apparatus is recorded.

For example, when the holographic recording medium 16 has a disc-like shape, the wavelength address hologram 28 is recorded in a lead-in area 16A located in an inner circumferential portion, as shown in FIG. 2.

In the wavelength address hologram 28, wavelength information of a reference beam when holographic recording is performed on the holographic recording medium 16 is recorded as a two-dimensional signal pattern for which a detection position is determined. Recording of the wavelength address hologram 28 is performed by generating modulation of a specific pattern by means of a spatial light modulator (not shown) and irradiating the lead-in area 16A with a beam with that specific pattern. In FIG. 2, the reference number 16B denotes a data area, 16C a clamping area, and 16D a central hole.

The wavelength address hologram 28 may be recorded in the data area 16B other than the lead-in area 16A in order to achieve sequential reading during reproduction. Moreover, in the case where information is two-dimensional data, the wavelength address hologram 28 may be contained as a part of the two-dimensional data.

The wavelength address hologram 28 can be recorded as a relief-type hologram having a concavo-convex pattern in a substrate. Alternatively, the wavelength address hologram 28 may be recorded in a recording layer of the holographic recording medium 16 as a volume phase hologram in a similar form to that of data. The latter case is more preferable because the same optical path and the same detector as those used for the reproducing laser beam during reproduction can be used for recording of the wavelength address hologram 28.

Next, a process for reproducing information recorded on the holographic recording medium 16 by using the aforementioned holographic memory reproduction apparatus 10 will be described.

When information is reproduced by means of this holographic memory reproduction apparatus 10, a reproducing beam from the semiconductor laser 12 accesses the lead-in area 16A first.

Thus, the wavelength address hologram 28 is irradiated. However, the detection position of the signal pattern of the wavelength address hologram 28 is determined in advance. Therefore, when there is a wavelength difference between the recorded wavelength address hologram 30 and the reproducing laser beam of the semiconductor laser 12, a signal intensity obtained by the spatial imaging element 22 becomes weak as the detection position is shifted from the predetermined position. The case where the signal intensity obtained by the spatial imaging element 22 is zero because of an excessively large shift will be described later.

The wavelength control device 24 detects the wavelength difference between the reproducing laser beam and the recording laser beam used for holographic recording from the above positional shift and controls the temperature of the semiconductor laser 12 by means of the temperature adjustment device 26.

The wavelength control device 24 repeats that temperature control until the detection position of the wavelength address hologram 28 reaches a predetermined position or the signal intensity exceeds a predetermined value, thereby controlling the temperature adjustment device 26 so as to make the wavelength of the reproducing laser beam coincident with that of the laser beam used for holographic recording and keep the temperature of the semiconductor laser 12 at that time.

More specifically, when a position of the signal detected by the spatial imaging element 22 is shifted from a predetermined position and an amount of the positional shift is detected, an amount of the wavelength difference between the laser beam used for recording and the reproducing laser beam is calculated from that amount of the positional shift. A driving current of the temperature adjustment device 26 is controlled in accordance with the amount of the wavelength difference. In addition, a temperature in the temperature adjustment device 26 is set by this control signal. In the case where the signal intensity obtained by the spatial imaging element 22 is zero, the driving current is increased or decreased until some signal intensity is obtained, and then the above control is performed.

As the signal pattern of the wavelength address hologram 28 other than the aforementioned pattern, a signal recorded with a plurality of recording wavelengths may be used.

For example, signal patterns corresponding to three wavelengths, i.e., a recording wavelength, a wavelength corresponding to the recording wavelength $-\delta$ nm (−), and a wavelength corresponding to the recording wavelength $+\delta$ nm (+) are employed, the wavelength of the semiconductor laser 12 is detected from a signal intensity difference between the recording wavelength (−) and the recording wavelength (+) and the temperature control for the semiconductor laser 12 by the temperature adjustment device 26 is performed so as to change an oscillation peak wavelength of the semiconductor laser 12.

The temperature adjustment device 26 may be controlled by repeating the above operation until the signal intensity difference between the recording wavelength (−) and the recording wavelength (+) is eliminated or the signal intensity of the recording wavelength exceeds a predetermined value, thereby making the wavelength of the reproducing laser beam coincident with that of the laser beam used for holographic recording and keeping the temperature of the semiconductor laser at that time.

Moreover, as the feedback control for the temperature adjustment device 26, the temperature of the semiconductor laser 12 is changed by the temperature adjustment device 26 during reproduction of the wavelength address hologram 28, a temperature of the semiconductor laser 12 at a time at which the detection position of the wavelength address hologram 28 reaches a predetermined position or the signal intensity exceeds a constant value is measured, and the temperature control device 26 may be controlled so that the thus measured temperature is kept.

This control can be used in the case where the wavelength of the reproducing laser beam during reproduction is largely shifted from that of the laser beam used for recording and therefore no signal can be detected in the spatial imaging element 22.

In addition, the temperature control with respect to the wavelength difference amount can be easily achieved if a relationship between the oscillation peak wavelength and the temperature of the semiconductor laser 12 is stored in the wavelength control device 24 in advance.

In the first embodiment, a light source of the recording laser beam and a light source of the reproducing laser beam for the holographic recording medium 16 may be different from each other. For example, a Kr ion laser (wavelength: 406.7 nm) may be used as the recording laser beam for recording information and a wavelength address hologram, and a GaN semiconductor laser (oscillation peak wavelength: 405 nm) may be used as the reproducing laser beam.

In a system in which the wavelength of the recording laser beam is fixed by using a solid-state laser or a gas laser, it is preferable that an initial temperature be set in the wavelength control device 26 to make the wavelength of the reproducing laser beam close to the wavelength of the recording laser beam. It is more preferable that the initial temperature be set for each oscillation peak wavelength of the semiconductor laser 12 to correspond to a variation of the oscillation peak wavelength. Due to this, the wavelength difference between the recording laser beam and the reproducing laser beam can be made small. Thus, the temperature range of the temperature control can be made narrower and a reproduction operation can be made shorter.

Second Embodiment

Figure 3:
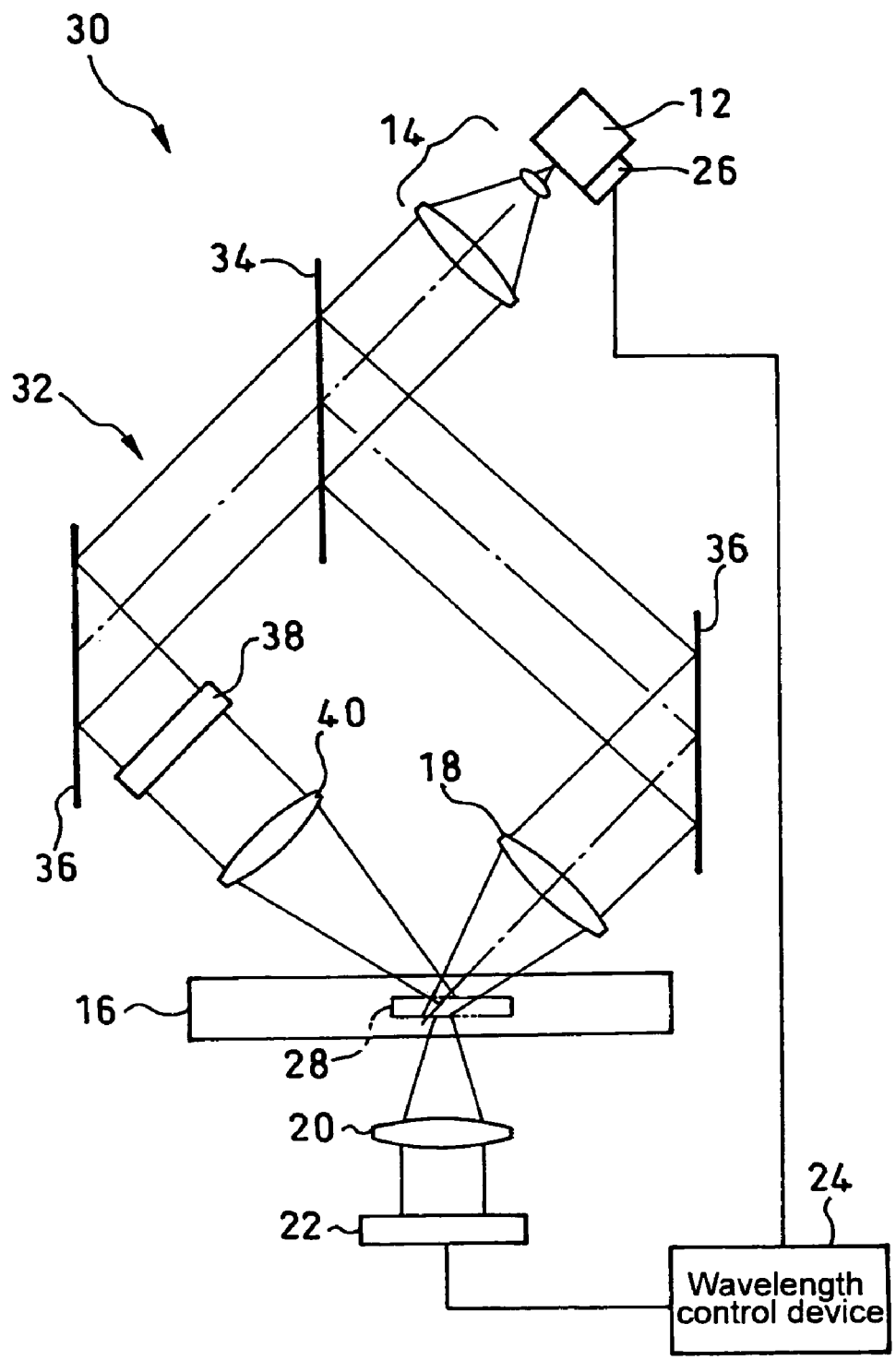
FIG. 3 is an optical system diagram showing a holographic recording and reproduction apparatus according to a second embodiment of the invention.

A second embodiment of the present invention shown in FIG. 3 will now be described.

In the second embodiment, recording of information and a wavelength address hologram on a holographic recording medium and reproduction of the information recorded on the holographic recording medium are performed by using the same apparatus.

A holographic recording and reproduction apparatus 30 of the second embodiment includes an object optical system 32 in the aforementioned holographic memory reproduction apparatus 10. The object optical system 32 is arranged to split the laser beam from the semiconductor laser 12 by a beam splitter 34 and direct a split beam as an object beam to the holographic recording medium 16.

Except for the above, the holographic recording and reproduction apparatus 30 has the same configuration as that of the holographic memory reproduction apparatus 10. Therefore, the same configuration in the holographic recording and reproduction apparatus 30 is labeled with the same reference numeral as that in FIG. 1 and the description thereof is omitted.

The object optical system 32 includes a mirror 36, a spatial light modulator 38, and a Fourier lens 40 that are arranged to direct the laser beam split by the beam splitter 34.

In this second embodiment, during recording, the laser beam emitted from the semiconductor laser 12 is split, and one split beam is made incident on the holographic recording medium 16 as a reference beam via the beam expander 14 and the lens 18. The other split beam is reflected by the mirror 36 as an object beam, is then spatially modulated by the spatial light modulator 38 in accordance with information to be recorded, and is incident on the holographic recording medium 16 via the Fourier lens 40.

The wavelength address hologram 28 is recorded by irradiating the lead-in area 16A or the data area 16B with a beam having a specific pattern generated by the spatial light modulator 38.

Reproduction of the thus recorded information is performed in the same manner as that using the aforementioned holographic memory reproduction apparatus 10 and therefore the description thereof is omitted.

INDUSTRIAL APPLICABILITY

The present invention enables the use of a semiconductor laser having an oscillation peak wavelength that can be varied by using wavelength information of a recording laser beam used for recording that is recorded as a wavelength address hologram in advance and making a wavelength of a reproducing laser beam during reproduction coincident with a wavelength of the recording laser beam, and enables a reproduction operation to be up quickly. Moreover, the present invention enables the use of reproducing laser beam having a most appropriate wavelength corresponding to an individual recording medium.

The invention claimed is:

1. A holographic memory reproduction apparatus for irradiating a holographic recording medium on which wavelength information of a recording laser beam is recorded as a wavelength address hologram with a reproducing laser beam from a semiconductor laser to reproduce information that is recorded by holographic recording, comprising:
   a temperature adjustment device for controlling a temperature of the semiconductor laser; and a wavelength control device for controlling a wavelength of the reproducing laser beam to be approximately coincident with a wavelength of the recording laser beam by adjusting a temperature of the semiconductor laser via the temperature adjustment device based on the wavelength information reproduced from the wavelength address hologram by the reproducing laser beam, prior to reproduction of the information recorded on the holographic recording medium with the reproducing laser beam.

2. The holographic memory reproduction apparatus according to claim 1, wherein
   the wavelength control device performs feedback control for the temperature adjustment device to make an intensity of a signal beam diffracted from the wavelength address hologram a constant value or place a detection position of the signal beam at a predetermined position during irradiation with the reproducing laser beam.

3. The holographic memory reproduction apparatus according to claim 2, wherein
the wavelength control device has information on an oscillation peak wavelength corresponding to the temperature of the semiconductor laser and is configured to control the temperature of the semiconductor laser to make the oscillation peak wavelength coincident with the wavelength of the recording laser beam.

4. The holographic memory reproduction apparatus according to claim 1, wherein
the wavelength control device has information on an oscillation peak wavelength corresponding to the temperature of the semiconductor laser and is configured to control the temperature of the semiconductor laser to make the oscillation peak wavelength coincident with the wavelength of the recording laser beam.

5. A holographic recording and reproduction apparatus for holographically recording information on a holographic recording medium using a recording laser beam and for reproducing the information recorded on the holographic recording medium using a reproducing laser beam, comprising:
a semiconductor laser for generating the recording laser beam and the reproducing laser beam;
a temperature adjustment device capable of adjusting a temperature of the semiconductor laser;
a wavelength information recording device for recording wavelength information of the recording laser beam as a wavelength address hologram on the holographic recording medium when the information is recorded on the holographic recording medium with the recording laser beam; and
a wavelength control device for controlling a wavelength of the reproducing laser beam to be approximately coincident with a wavelength of the recording laser beam by adjusting the temperature of the semiconductor laser via the temperature adjustment device based on a signal beam diffracted from the wavelength address hologram by the reproducing laser beam, when the information recorded on the holographic recording medium is reproduced with the reproducing laser beam.

6. The holographic recording and reproduction apparatus according to claim 5, wherein
the wavelength control device includes a circuit for performing feedback control for the temperature adjustment device to make an intensity of the signal beam diffracted from the wavelength address hologram a constant value or place a detection position of the signal beam at a predetermined position during irradiation with the reproducing beam.

7. The holographic recording and reproduction apparatus according to claim 6, wherein
the wavelength control device has information on an oscillation peak wavelength corresponding to the temperature of the semiconductor laser and is configured to control the temperature of the semiconductor laser to make the oscillation peak wavelength coincident with the wavelength of the recording laser beam.

8. The holographic recording and reproduction apparatus according to claim 5, wherein
the wavelength control device has information on an oscillation peak wavelength corresponding to the temperature of the semiconductor laser and is configured to control the temperature of the semiconductor laser to make the oscillation peak wavelength coincident with the wavelength of the recording laser beam.

9. A holographic recording and reproducing method for holographically recording information on a holographic recording medium using a recording laser beam and for reproducing the information recorded on the holographic recording medium using a reproducing laser beam, comprising:
a process of recording wavelength information of the recording laser beam as a wavelength address hologram on the holographic recording medium when the information is recorded on the holographic recording medium with the recording laser beam;
a process of irradiating the wavelength address hologram with the reproducing laser beam to reproduce the wavelength information from a diffracted signal beam, prior to reproduction of the information recorded on the holographic recording medium; and
a process of adjusting a temperature of a semiconductor laser emitting the reproducing laser beam to make a wavelength of the reproducing laser beam approximately coincident with a wavelength in accordance with the wavelength information based on the reproduced wavelength information.

10. The holographic recording and reproducing method according to claim 9, wherein
control is performed to make an intensity of the signal beam diffracted from the wavelength address hologram a constant value or place a detection position of the signal beam at a predetermined position during irradiation with the reproducing laser beam.

\* \* \* \* \*